July 17, 1962 R. A. VANSLETTE 3,045,197
ROTARY ELECTROMAGNETIC PICKOFF DEVICE
Filed June 15, 1959 4 Sheets-Sheet 1

INVENTOR
ROBERT A. VANSLETTE
BY Roger W. Jensen
ATTORNEY

July 17, 1962 R. A. VANSLETTE 3,045,197
ROTARY ELECTROMAGNETIC PICKOFF DEVICE
Filed June 15, 1959 4 Sheets-Sheet 2

INVENTOR
ROBERT A. VANSLETTE
BY Roger W. Jensen
ATTORNEY

July 17, 1962 R. A. VANSLETTE 3,045,197
ROTARY ELECTROMAGNETIC PICKOFF DEVICE
Filed June 15, 1959 4 Sheets-Sheet 3

INVENTOR
ROBERT A. VANSLETTE

BY Roger W. Jensen
ATTORNEY

July 17, 1962  R. A. VANSLETTE  3,045,197
ROTARY ELECTROMAGNETIC PICKOFF DEVICE
Filed June 15, 1959  4 Sheets-Sheet 4

INVENTOR.
ROBERT A. VANSLETTE
BY Roger W. Jensen
ATTORNEY

United States Patent Office 3,045,197
Patented July 17, 1962

3,045,197
ROTARY ELECTROMAGNETIC PICKOFF DEVICE

Robert A. Vanslette, Medfield, Mass., assignor to Minneapolis-Honeywell Regulator Company, Minneapolis, Minn., a corporation of Delaware
Filed June 15, 1959, Ser. No. 820,338
10 Claims. (Cl. 336—135)

This invention pertains to an improvement in electromagnetic devices and has application to electromagnetic pickoffs.

There have been numerous prior art electromagnetic pickoffs of both the rotary and linear type for converting rotary and/or linear motions into electrical signals of a sense and magnitude indicative of the sense and magnitude of the relative movement between a pair of elements in the pickoffs.

There are various figures of merit for electromagnetic pickoffs. Generally speaking the ideal electromagnetic pickoff has a large output or high sensitivity consistent with a minimum size and weight.

One of the specific types of prior art pickoffs has included a stator element having a yoke portion from which depend a plurality of pole members. Primary windings and secondary windings are wound around pairs of pole members with the primary windings being offset one pole from the secondary windings.

An armature member cooperates with the stator so as to change the flux distribution in the poles as a function of relative movement between the armature and stator and as a consequence thereof induce signals in the secondary windings as a function of the sense and magnitude of deviation between the two members. This particular type of prior art pickoff device has a relatively low sensitivity as compared to that of the present invention. One of the primary reasons for this relatively low sensitivity is because a surprisingly low percentage of the available winding space is actually used for effective windings. This is because of interference in the end loops between the primary and secondary windings. In one prior art pickoff, for example, approximately 50% of the winding space was wasted.

The present invention provides a unique core element having a unique pole configuration which is characterized by permitting the primary windings and secondary windings to be placed thereon in such a way that there is no interference therebetween as is the case with the prior art device described above. More specifically the present invention provides the primary and secondary slots at different radial distances away from the center of rotation. This in turn places the primary and secondary slots at different radial distances which minimizes end turn interference between the primary windings and secondary windings.

Also the prior art type of device described above had the primary flux flowing through the entire core structure, this required each individual pole element in the core structure to have a sufficient cross-sectional area to carry all of the flux. The present invention provides a sufficient cross-sectional area in portions of the pole elements to carry the primary flux but does not require that the primary flux traverse, in the null position, the entire pole element. Accordingly a portion of the pole element may be of relatively small cross-sectional area which gives a further increase in space available for windings. The present invention has the secondary windings encompassing only a single pole element as opposed to prior art devices which had the secondary windings encompassing two pole elements and again there is a saving in space because whenever a winding encompasses more than one pole element the space between the two pole elements being encompassed is not being utilized.

The present invention is characterized by having a core element comprising a yoke portion from which depend or extend a plurality of spaced poles. Each pole is characterized by having two spaced apart pole extensions extending therefrom and the pole extensions each terminate in a pole face which collectively define a generally continuous outer surface which in one embodiment may be a generally circular periphery and in another case may be a planar surface. The two spaced apart pole extensions thereof define therebetween a so-called secondary slot. The secondary windings are adapted to be first positioned in the secondary slots and each secondary winding loop encompasses a single pole portion.

Primary winding means are adapted to lie in adjacent primary slots, each primary winding loop encompassing a so-called pair of pole extensions which constitutes a pole extension associated with one pole and the nearest adjacent pole extension of another pole.

The primary winding means are adapted to be energized from a suitable source and the secondary winding means are adapted to be connected to a suitable means adapted to receive a signal indicative of relative movement between the core element above described and armature or rotor element adapted to be positioned relative to the core element movement therewith, the armature element having so-called pole bridging elements as an integral part thereof which depend from a yoke portion and the bridging portions being so-shaped and so positioned in the null position of the device so that each bridging element normally bridges equal areas of the pole faces of the two pole extensions associated with a single pole. According to the present invention the primary flux (produced as a result of the primary windings being energized) normally flows through the two pole extensions associated with each pole, the return path for this primary flux in this normal or null position being through the bridging element associated therewith. Under this null condition of operation none of the primary flux flows through the pole portion per se. When there is a relative displacement or rotation between the armature or rotor element and the core element then the normal flux or primary flux path is upset and the primary flux now flows in part through the pole portions and returns through the adjacent pole portions and through the yoke portion of the armature element for its return path. In this "away from null condition" since flux is flowing through the main pole portions then signals will be induced in the secondary windings indicative of the sense and magnitude of deviation.

It is an object of this invention therefore to provide an improved control apparatus.

A further object of this invention is to provide an improved electromagnetic device characterized by a much higher utilization of the winding space than had been previously accomplished by prior art devices.

A further object of the invention is to provide an electromagnetic pickoff having a greater sensitivity based upon a unit volume than prior art electromagnetic pickoffs.

Other and more specific objects of the invention, including constructional details will be set forth more fully in and become apparent from a reading of the following specification and appended claims, in conjunction with the accompanying drawing in which:

Figure 3:
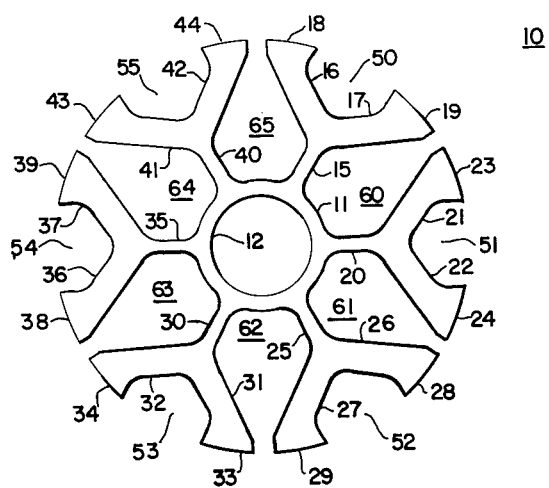
FIGURE 3 is a plan view of an individual stator lamination.

Referring first to FIGURE 3, the reference numeral 10 generally depicts a single lamination for the stator core element of a control device such as an electromagnetic pickoff. Each lamination 10 has a central generally circular stator yoke portion 11 provided with a central bore 12 therethrough so that the individual laminations may be if desired mounted in a central shaft not shown. A plurality of poles are equiangularly spaced about the yoke portion 11 and extend radially therefrom. These poles are identified in FIGURE 3 by reference numerals 15, 20, 25, 30, 35, and 40. Each of the pole portions 15, 20, etc., is characterized by having a relatively small cross-sectional area, the importance of which will be noted below. Each of the poles is also characterized by having a pair of pole extensions extending therefrom, the pole extensions being characterized by being spaced apart and by each having a cross-sectional area substantially larger than the cross-sectional area of the pole from which it extends. The pole extensions associated with pole 15 are identified by reference numerals 16 and 17 and they terminate in pole faces 18 and 19 respectively. Those associated with pole 20 are identified by reference numerals 21 and 22 and have pole faces 23 and 24 respectively. In a similar manner the pole extensions associated with poles 25, 30, 35, and 40, are identified respectively by 26, 27; 31, 32; 36, 37; and 41, 42. Likewise, these last recited pole extensions have pole faces 28, 29, 33, 34, 38, 39, 43, and 44 respectively.

The two pole extensions for each pole define therebetween a so-called primary slot. For example the pole extensions 16 and 17 associated with the pole 15, being spaced apart, define therebetween a primary slot 50. In a similar manner primary slots 51, 52, 53, 54 and 55 are defined between the pole extensions associated with poles 20, 25, 30, 35, and 40 respectively.

Each two adjacent poles and adjacent extensions thereof define therebetween a so-called secondary slot. For example a secondary slot 60 is defined between poles 15 and 20 and their adjacent extensions 17 and 21. In a similar manner secondary slots 61, 62, 63, 64, and 65 are defined respectively between poles 20 and 25 and adjacent extensions thereof, poles 25 and 30 and adjacent extensions thereof, poles 35 and 40 and adjacent extensions thereof, and poles 40 and 15 and adjacent extensions thereof.

Primary winding means are provided and are adapted to be placed into the primary slots 50—55. Either individual type or skein type windings may be provided. Each "pair of pole extensions" is encompassed by a closed loop or primary winding. A "pair of pole extensions" is defined as being a pole extension associated with one pole and the nearest adjacent pole extension of another pole. For example, referring to FIGURE 1, pole extensions 17 and 21 form a "pair of pole extensions." It will be noted in FIGURE 1 that the pair of pole extensions 17 and 21 are encompassed by a primary winding schematically shown as a single turn 70. In like fashion the other pairs of pole extensions are also encompassed by their own respective coils of winding being identified in FIGURE 1 by reference numerals 71, 72, 73, 74, and 75 (proceeding clockwise from winding 70). As indicated the windings 70—75 may be individual windings wound about their respective pair of pole extensions or may be a continuous winding which is skein wrapped about the individual pairs of pole extensions in the well-known manner.

Figure 1:
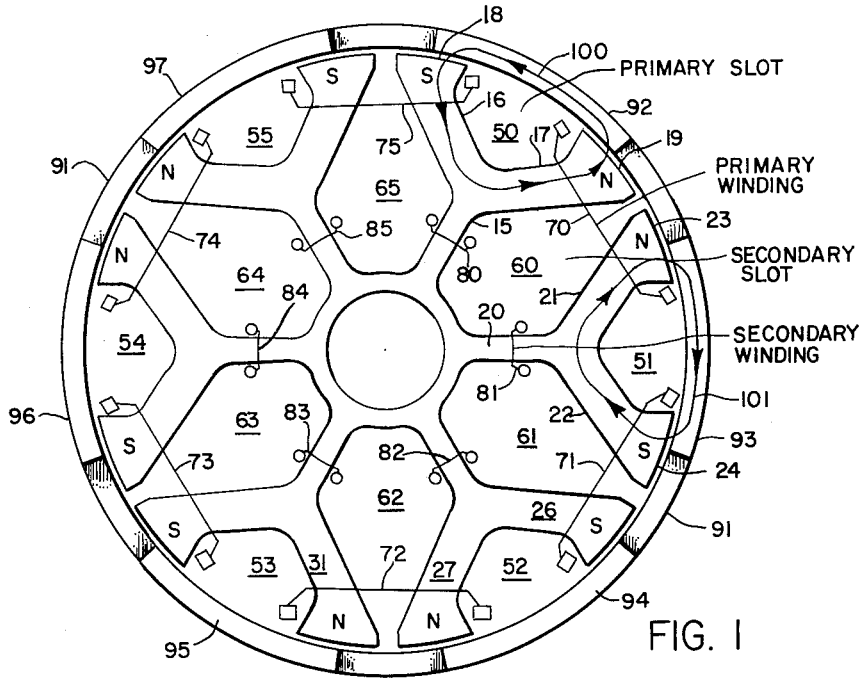
FIGURE 1 is a cross-sectional view of an electromagnetic device including a stator element and an armature element with the windings on the stator element being shown somewhat schematically for purposes of clearness. In this view the armature element is shown at its normal or null or neutral position relative to the stator element.

Secondary winding means are positioned in the secondary slots and the individual secondary windings are characterized by encompassing individual poles. Again the secondary winding may be separate windings serially connected together or may be a continuous winding skein wrapped in the well-known fashion so as to separately encompass the individual poles. As shown in FIGURE 1 the secondary windings associated with poles 15, 20, 25, 30, 35, and 40, commencing with pole 15 and proceeding therefrom in a clockwise fashion are identified by reference numerals 80, 81, 82, 83, 84, and 85 respectively.

In the actual construction process a plurality of individual laminations 10 as shown in FIGURE 3 would be arranged or stacked together into a stator core element and bonded together by suitable means. The secondary windings 80—85 would first be placed upon the core element by being fitted down into the so-called secondary slots 60—65. Then the primary windings 70—75 would be placed on the core element as indicated fitting into the so-called primary slots 50—55.

Figure 5:
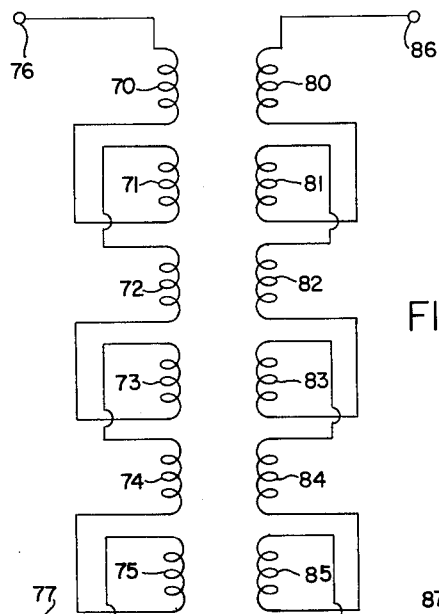
FIGURE 5 is a schematic representation of the primary windings and secondary windings shown in FIGURES 1 and 4.

In FIGURE 5 the primary windings 70—75 and secondary windings 80—85 are schematically represented. The primary windings 70—75 are connected serially together and are connected to a pair of terminals 76 and 77 adapted to be connected to a suitable source of excitation such as an alternating voltage. The primary windings 70—75 are arranged relative to their respective "pair of pole extensions" so that successive pairs of pole extensions have opposite instantaneous polarities when the primary windings 70—75 are energized by an alternating voltage. For example, the pole extensions in FIGURE 1 are shown with an instantaneous polarity. It will be noticed that pole extensions 17 and 21 have an instantaneous north polarity and proceeding clockwise therefrom the pole extensions 22 and 26 have a south polarity; pole extensions 27 and 31 have a north polarity, etc.

Figure 4:
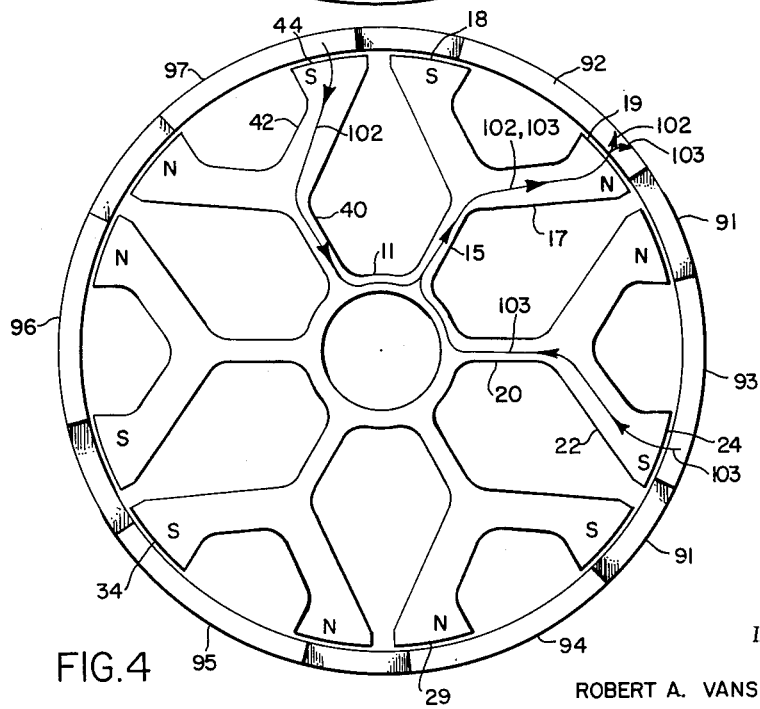
FIGURE 4 is a view similar to that of FIGURE 1 with the armature or rotor element moved relative to the stator element away from its null or neutral or normal position.
Figure 2:
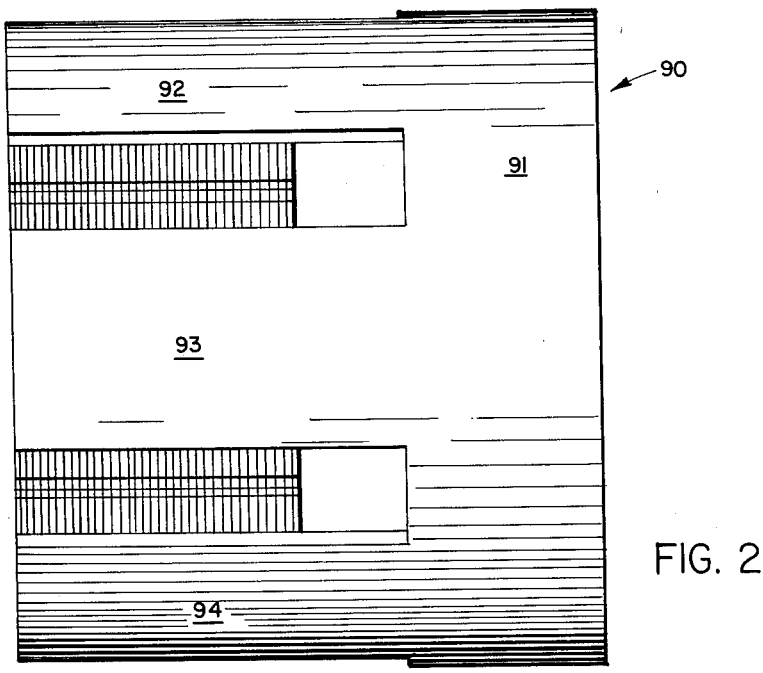
FIGURE 2 is a side elevational view of the device shown in FIGURE 1.

One form of the armature or rotor element which may be associated with the stator element of FIGURES 1, 2, and 4 is identified generally by the reference numeral 90 (see FIGURE 2) and constitutes a generally cylindrically shaped yoke portion 91 from which axially depend or extend a plurality of bridging elements 92, 93, 94, 95, 96, and 97. The inner diameter of the cylindrically shaped armature element 90 is slightly greater than the outer diameter of the stator element, this outer diameter being generally defined by the pole faces of the individual pole extensions. The armature element 90 is adapted to be supported by suitable means not shown for movement relative to the stator element and is adapted so that in its normal or neutral or null position the bridging elements 92—97 bridge equal areas of the pole faces of the pole extensions of a pole. This normal or neutral or null position of the bridging elements 92—97 relative to the pole extensions of the poles of the stator element is clearly shown in FIGURE 1. For example it will be noted that the bridging element 92 depending from the yoke portion 91 of the armature 90 is positioned so that it is bridging substantially equal areas of the pole faces 18 and 19 of the pole extensions 16 and 17 respectively of the pole 15.

OPERATION

As explained, the primary windings 70—75 when energized by an alternating voltage may provide by way of example the instantaneous polarities shown in FIGURE 1 where successive pairs of pole extensions have opposite polarities. As further explained at the normal or null or neutral position of the armature element relative to the stator element the pair of pole extensions extending from each pole are bridged equally by a single bridging element of the armature. The importance of this is that at null condition (armature at null position relative to stator), the primary electromagnetic flux produced as a result of the energization of the primary windings 70—75 has a complete magnetic circuit defined by the two pole extensions associated with the single pole and its cooperating bridging elements on the armature. For example at the null condition the flux produced by primary winding 70 may be considered to leave pole faces 19 and 23. The flux leaving pole face 19 is identified by reference numeral 100 and it enters bridging element 92 and returns to the stator by way of pole face 18. This particular magnetic circuit is completed by pole extension 16 and pole extension 17. The winding 75 at this time is producing a south polarity at pole face 18 which aids in the establishment of the flux at 100 produced by winding 70. To continue, the flux from winding 70 which leaves pole face 23 is identified by reference numeral 101 and it enters bridging element 93 of the armature 90 and returns from the armature to the stator by way of pole face 24, the remainder of the magnetic circuit being completed through pole extensions 22 and 21 of the pole 20. The pole face 24 has an instantaneous south polarity which assists the flowing of flux 101 through the last described magnetic circuit. In the same manner all of the other primary windings produce primary magnetic flux lines through only the pole extensions and the bridging elements of the armature at null condition. It should be noted that at null condition substantially no flux is passing through the pole portions 15, 20, 25, 30, 35, and 40, per se. Accordingly, at null condition no signals are induced in the secondary windings 80—85.

In FIGURE 4 the armature element 90 and the stator element have been shown rotated relative to one another away from their normal or neutral or null position. This has been depicted by armature element 90 being rotated in a clockwise direction relative to the stator element from that shown in FIGURE 1. When relative rotation does occur between the two elements then the bridging portions 92—97 no longer bridge equal areas of the two pole extensions associated with each pole. For example bridging element 92 in FIGURE 4 bridges a greater area of the pole face 19 than it does of the pole face 18 of the pole extensions 16 and 17 of the pole 15. It should be pointed out that in FIGURE 4 the primary windings and secondary windings have not been shown for purposes of simplicity of presentation but they would be identical to those shown in FIGURE 1 and the same instantaneous polarities for the various pole extensions may be assumed. Since the bridging elements 92—97 are now no longer bridging equal areas of the pole faces of the pole extensions of each pole the primary flux is unbalanced and now no longer can flow entirely through the pole extensions and the bridging element. In other words the primary flux must find another path through which to flow. This additional flow path is permitted by utilizing the yoke portion 91 of the armature element, the pole portions 15, 20, 25, 30, 35, and 40, and the yoke portion 11 of the stator elements. A typical flux distribution for pole 15 is depicted in FIGURE 4 and is indicative of the flux distribution that the other poles would have. Considering now pole extension 17 of pole 15 in FIGURE 4 which has a north polarity, a portion of the flux that leaves pole face 19 may still flow through the bridging element 92 and return through pole face 18 as was traced by flux line 100 in FIGURE 1. However the amount of this flux will be somewhat less than was flowing in FIGURE 1 depending upon the amount of relative rotation between the two elements because of the greater reluctance in this magnetic circuit than was previously the case. Of more importance from the standpoint of generating useful signals there are additional flow paths for the flux from pole face 19. One is represented by reference numeral 102 as leaving pole face 19 and entering into bridging element 92. From that point it would travel the axial length of bridging element 92 and enter into the yoke portion 91 of the armature 90 and then out along the axial extent of bridging element 97 at which point it re-enters the stator element at pole face 44 of pole extension 42 of pole 40. Flux 102 continues through pole extension 42, of pole 40, yoke portion 11 of stator, pole 15 and its extension 17. It will be noted that flux 102 links secondary windings 85 and 80. A second additional path for flux flow is identified by reference numeral 103 which also leaves pole face 19 and enters into bridging element 92 flowing along the axial extent thereof to the yoke portion 91 of the armature 90 and thence out through the bridging element 93 to re-enter the stator core structure at pole face 24 of the pole extension 22 extending from the pole 20. The continuation of the tracing of the flow path for flux 103 includes the pole extension 22, the pole 20, yoke 11 of the stator, pole 15, and pole extension 17 thereof. Thus the flux 103 links two secondary coils 81 and 80. The flux paths for the other poles may also be traced out in a similar manner. For example the flux entering bridging element 94 from the pole face 29 would divide and enter the armature element returning partly through pole face 24 and partly through pole face 34. The important thing to note is that when there is a relative rotation or movement between the armature element and the stator element, the secondary windings 80—85 are linked by flux and these fluxes 102 and 103, etc., are identified as signal fluxes. Further, the voltages induced in the secondary windings as a function of the number of secondary winding turns, amount and rate of change of flux, etc., may then be utilized for a control function. It will be understood that the secondary windings 80—85 will be connected together in a series additive arrangement so that the signals induced thereby by the signal fluxes flowing therethrough will be cumulative. As shown in FIGURE 5 the secondary windings are all connected together schematically and terminate in a pair of output terminals 86 and 87 which may be connected to suitable additional controlled apparatus, not shown, which would respond to a signal indicative of the sense and magnitude of the relative rotation between the armature element 90 and the stator.

While not shown specifically herein, it will be understood that if the armature element 90 were rotated in a counterclockwise direction in FIGURE 4 instead of a clockwise direction as shown then the flux distribution paths would have been reversed so that the signals induced in the secondary windings would be a reversed sense. Thus the device is sensitive to the sense and magnitude of relative motion and produces a signal of one sense or the other depending upon which sense the relative movement between the stator and armature was.

As indicated when the primary windings 70—75 are energized by alternating current, the induction device described functions as a displacement pickoff. It should also be understood that the primary windings may be energized by direct current and when so energized, functions as a velocity pickoff, i.e., produces a signal of a sense and magnitude indicative of the direction and rate of relative movement between the stator element and armature element.

Figure 6:
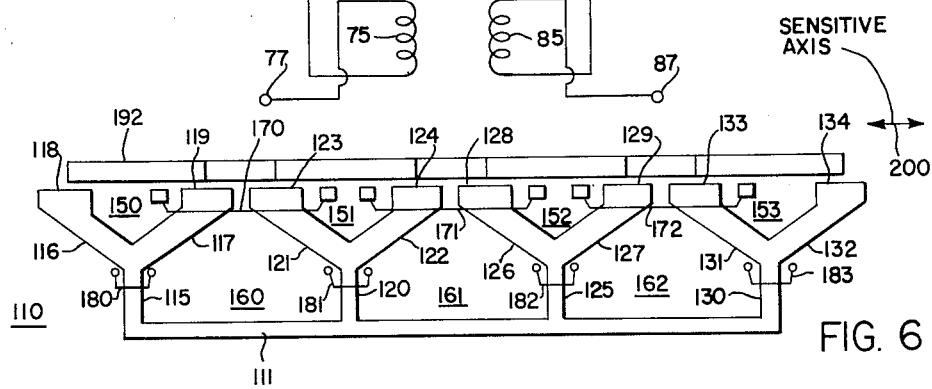
FIGURE 6 is a somewhat schematic representation of the side elevation of a linear electromagnetic pickoff constructed according to the teaching of the present invention.
Figure 7:
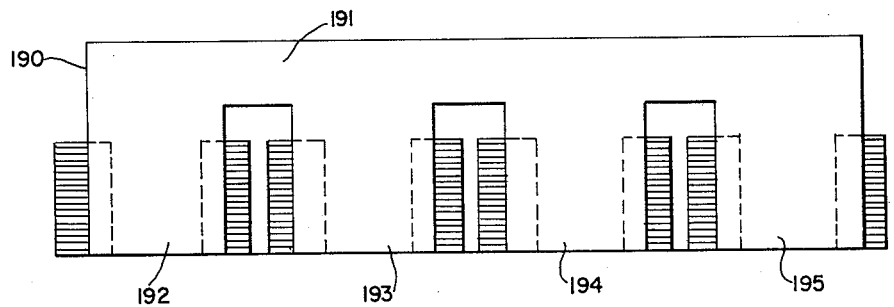
FIGURE 7 is a top view of the device shown in FIGURE 6.

*Figures 6 and 7*

In FIGURES 6 and 7 is depicted an embodiment of the invention wherein a linear induction pickoff has been provided in contrast to the rotary type of induction pickoff shown in FIGURES 1–5. Again a stator element and an armature element are provided. The stator element is identified by reference numeral 110 and includes a yoke portion 111 from which depend a plurality of spaced pole elements 115, 120, 125, and 130. Each pole element has extending therefrom a pair of spaced apart pole extensions and each pole extension terminates in a pole face. For example pole 115 has pole extensions 116 and 117 which respectively terminate in pole faces 118 and 119. Similarly poles 120, 125, and 130 have pole extensions 121, 122; 126, 127; and 131, 132; and pole faces 123, 124; 128, 129; and 133, 134 respectively.

The two pole extensions for each pole define therebetween a primary slot similar to the device shown in FIGURES 1–5. For example pole extensions 116 and 117 define primary slot 150. Proceeding from left to right in FIGURE 6 the remaining primary slots are identified by reference numerals 151, 152, and 153. Likewise, secondary slots are defined between adjacent poles 115 and 120 and their adjacent extensions 117 and 121 define a secondary slot 160. Proceeding from left to right in FIGURE 6 the remaining secondary slots are identified by reference numerals 161 and 162. Primary windings are adapted to be positioned in the primary slots so as to encompass a "pair of pole extensions," a "pair of pole extensions" again being defined as a pole extension associated with one pole and the nearest adjacent pole extension of another pole. For example primary winding 170 encompasses pole extension 117 of pole 115 and extension 121 of pole 120. The remaining primary windings proceeding from left to right in FIGURE 6 are identified by reference numerals 171 and 172. Likewise secondary windings are provided and encompass each of the pole portions the secondary windings being associated with poles 115, 120, 125, and 130, being respectively identified by reference numerals 180, 181, 182, and 183.

An armature element 190 is provided and constitutes a generally flat-shaped element including a yoke portion 191 from which depend a plurality of pole bridging elements 192, 193, 194, and 195. The armature element 190 is adapted to be supported by suitable means not shown relative to the stator element 110 and at its normal position the bridging elements 192—195 would bridge equal areas of the pole faces of the pole extensions of a single pole. For example bridging element 192 when the armature is at its null or normal or neutral position relative to the stator 110 would bridge equal areas of the pole faces 118 and 119 of the poles extensions 116 and 117 of the pole 115.

OPERATION

The sensitive axis for the sensing of motion by the electromagnetic pickoff shown in FIGURES 6 and 7 is identified by the reference numeral 200. In general, the operation of the device shown in FIGURE 6 and FIGURE 7 is identical to that shown for the device in FIGURES 1–5. It will be understood that at normal or null conditions when the armature element is symmetrically positioned relative to the stator that the primary fluxes will flow substantially solely through the pole extensions and not through the pole elements per se. Then when there is relative motion of one sense or the other between the armature element and the stator element flux will flow through the pole elements per se, namely poles 115, 120, 125, 130 and in doing so will link the secondary windings 180—183 so as to induce therein control signals which may be utilized by all of the secondary windings being connected together in a series additive arrangement in the same manner as is shown in FIGURE 5 for the device of FIGURES 1–5 so that a useful output signal may be produced. The device of FIGURES 6 and 7 is the same as that of FIGURES 1–5 in that the output signal will be of a sense and magnitude indicative of the sense and magnitude of relative movement between the stator element and armature element.

Figure 8:
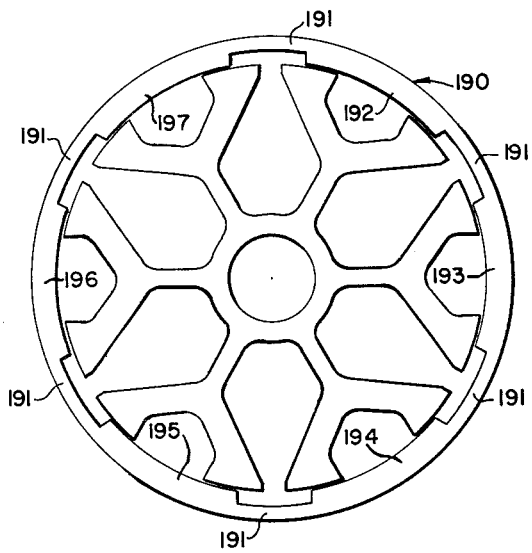
FIGURE 8 is a view similar to FIGURE 1 of a device comprising a modified type of armature or rotor element.
Figure 9:
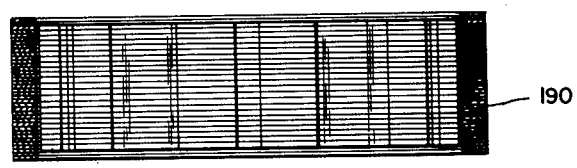
FIGURE 9 is a side elevational view of the device shown in FIGURE 8 with winding means depicted which are omitted from FIGURE 8.

*Figures 8 and 9*

In FIGURES 8 and 9 an alternate form of armature element is shown in combination with a stator element generally identical to that of FIGURES 1–4. The solid armature element 90 of FIGURES 1–4 has been replaced in FIGURES 8 and 9 by a laminated armature 190 having yoke portions 191 and bridging portions 192, 193, 194, 195, 196, and 197 analogous in function to the yoke portions 91 and bridging to the yoke portions 91 and bridging elements 92—97 respectively of armature 90. At the null or neutral position each of the bridging portions 192—197 shades equal areas of the pole faces of the pole extensions of a pole. The general operation of the device of FIGURES 8 and 9 is similar to that of FIGURES 1–4 and accordingly will not be repeated.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. In an electromagnetic device comprising in combination: a stator element having a central circular stator yoke portion; a plurality of equiangularly spaced poles radially extending from said yoke portion; two spaced apart pole extensions for each of said spaced poles, said pole extensions each terminating in a pole face, said pole faces collectively defining a circular periphery, the two pole extensions for each pole defining therebetween a primary slot; and each two adjacent poles and adjacent extensions thereof defining therebetween a secondary slot; first winding means adapted to be energized by an alternating voltage and positioned in said primary slots so as to encompass pairs of said pole extensions, a pair of said pole extensions being a pole extension associated with one pole and the nearest adjacent pole extension of another pole; secondary winding means positioned in said secondary slots so as to encompass said poles; and an armature element having pole bridging elements connected by an armature yoke portion; said armature element being adapted to be positioned relative to said stator element for relative rotation therewith and with each of said bridging elements normally bridging equal areas of the pole faces of the pole extensions of a pole.

2. In an electromagnetic device comprising in combination: a stator element having a yoke portion; a plurality of spaced poles extending from said yoke portion, two spaced pole extensions extending from each of said spaced poles, the two pole extensions for each pole defining therebetween a primary slot; and each two adjacent poles and adjacent extensions thereof defining therebetween a secondary slot; primary winding means adapted to be energized by an alternating voltage and positioned in said primary slots so as to encompass pairs of said pole extensions, a pair of said pole extensions being a pole extension associated with one pole and the nearest adjacent pole extension of another pole; and secondary winding means positioned in said secondary slots so as to encompass said poles.

3. In an electromagnetic device comprising in combination: a stator element having a yoke portion; a plurality of equally spaced poles extending from said yoke portion; two spaced apart pole extensions extending from each of said spaced poles, said pole extensions each terminating in a pole face, said pole faces collectively defining a circular periphery, the two pole extensions for each pole defining therebetween a primary slot, and each two adjacent poles and adjacent extensions thereof defining therebetween a secondary slot; first winding means adapted to be energized by an alternating voltage and positioned in said primary slots so as to encompass pairs of said pole extensions, a pair of said pole extensions being a pole extension associated with one pole and the nearest adjacent pole extension of another pole; secondary winding means positioned in said secondary slots so as to encompass said poles; and an armature element having pole bridging elements connected by an armature yoke portion; said armature element being adapted to be positioned adjacent to said stator element for relative movement therewith and with each of said bridging elements normally bridging equal areas of the pole faces of the pole extensions of a pole.

4. In an electromagnetic device comprising in combination: a core element having a yoke portion; a plurality of poles extending from said yoke portion; two pole extensions extending from each of said poles, the two pole extensions for each pole defining therebetween a first slot; and each two adjacent poles defining therebetween a second slot; first winding means adapted to be energized by a voltage and positioned in said first slots so as to encompass pairs of adjacent pole extensions; and second winding means positioned in said second slots and encompassing said poles.

5. In an electromagnetic device: a core element having a yoke portion; a plurality of poles extending from said yoke portion; two pole extensions extending from each of said poles, said pole extensions each having a cross-sectional area considerably greater than the cross-sectional area of the pole, the two pole extensions for each pole defining therebetween a first slot; and each two adjacent poles and extensions thereof defining therebetween a second slot, and winding means positioned in said slots.

6. In an electromagnetic device: a core element having a yoke portion; a plurality of poles extending from said yoke portion, two pole extensions extending from each of said poles, and defining therebetween a first slot, and each two adjacent poles and extensions thereof defining therebetween a second slot, first winding means positioned in said first slots, and second winding means positioned in said second slots, one of said winding means adapted to be energized and produce a flux when energized which causes one of said pole extensions on each of said poles to act as a north pole and the other of said pole extensions on each pole to act as a south pole.

7. In an electromagnetic device comprising in combination: a stator element having a central circular stator yoke portion; a plurality of equiangularly spaced poles radially extending from said yoke portion; two spaced apart pole extensions for each of said spaced poles, said pole faces collectively defining a circular periphery; first winding means adapted to be energized by an alternating voltage, said first winding means being positioned on said stator so as to encompass pairs of said pole extensions, a pair of said pole extensions being a pole extension associated with one pole and an adjacent pole extension of another pole adjacent to said one pole; second winding means positioned on said stator so as to encompass said poles; and an armature element having pole bridging elements connected by an armature yoke portion, said armature element being adapted to be positioned relative to said stator element for relative rotation therewith and with each of said bridging elements normally bridging equal areas of the pole faces of the pole extensions of a pole.

8. In an electromagnetic device comprising in combination: a stator element having a central circular stator yoke portion; a plurality of equiangularly spaced poles radially extending from said yoke portion; two spaced apart pole extensions for each of said spaced poles, said pole extensions each terminating in a pole face and said faces collectively defining a circular periphery; first winding means adapted to be energized by an alternating voltage, said first winding means being positioned on said stator so as to encompass pairs of said pole extensions, a pair of said pole extensions being a pole extension of one pole and the nearest pole extension of another pole; second winding means positioned on said stator so as to encompass said poles; and an armature element having pole bridging elements connected by an armature yoke portion; said armature element being adapted to be positioned relative to said stator element for relative rotation therewith and with each of said bridging elements normally bridging equal areas of the pole faces of the pole extensions of a pole.

9. In an electromagnetic device comprising in combination: a stator element having a yoke portion; a plurality of equally spaced poles extending from said yoke portion; two spaced apart pole extensions for each of said spaced poles, said pole extensions each terminating in a pole face; first winding means adapted to be energized by an alternating voltage and positioned on said stator so as to encompass pairs of said pole extensions, a pair of said pole extensions being a pole extension associated with one pole and the nearest pole extension of another pole; second winding means positioned on said stator so as to encompass said poles and an armature element having pole bridging elements connected by an armature yoke portion; said armature element being adapted to be positioned adjacent to said stator element for relative movement therewith and with each of said bridging elements normally bridging equal areas of the pole faces of the pole extensions of a pole.

10. In an electromagnetic device comprising in combination: a stator element having a yoke portion; a plurality of equally spaced poles extending from said yoke portion; two spaced apart pole extensions for each of said spaced poles; first winding means adapted to be energized by an alternating voltage and positioned on said stator so as to encompass pairs of said pole extensions, a pair of said pole extensions being a pole extension associated with one pole and the nearest pole extension of another pole; second winding means positioned in said stator so as to encompass said poles and an armature element having pole bridging elements and being adapted to be positioned adjacent to said stator element for relative movement therewith and with said bridging elements adjacent said pole faces of said pole extensions of said pole.

References Cited in the file of this patent

UNITED STATES PATENTS

| 1,659,729 | Gannett | Feb. 21, 1928 |
| 2,847,664 | Lewis | Aug. 12, 1958 |
| 2,911,550 | Bessiere | Nov. 3, 1959 |

FOREIGN PATENTS

| 512,158 | France | Oct. 7, 1920 |